Oct. 11, 1938.　　　J. A. LOGAN ET AL　　　2,132,536
CONTROL MECHANISM FOR LIQUID DISPENSING APPARATUS
Filed Jan. 8, 1938　　　7 Sheets-Sheet 1

INVENTORS
JOSEPH A. LOGAN AND
BY WARREN H. DE LANCEY
Chapin + Neal
ATTORNEYS

Oct. 11, 1938.　　　　J. A. LOGAN ET AL　　　　2,132,536
CONTROL MECHANISM FOR LIQUID DISPENSING APPARATUS
Filed Jan. 8, 1938　　　　7 Sheets-Sheet 4

INVENTORS
JOSEPH A. LOGAN AND
BY WARREN H. DE LANCEY
Chapin + Neal
ATTORNEYS

Oct. 11, 1938.  J. A. LOGAN ET AL  2,132,536
CONTROL MECHANISM FOR LIQUID DISPENSING APPARATUS
Filed Jan. 8, 1938  7 Sheets-Sheet 5

INVENTORS
JOSEPH A. LOGAN AND
BY WARREN H. DE LANCEY
Chapin & Neal
ATTORNEYS

Fig. 9.

Patented Oct. 11, 1938

2,132,536

UNITED STATES PATENT OFFICE 2,132,536

CONTROL MECHANISM FOR LIQUID DISPENSING APPARATUS

Joseph A. Logan and Warren H. De Lancey, Springfield, Mass., assignors to Gilbert & Barker Manufacturing Company, West Springfield, Mass., a corporation of Massachusetts Application January 8, 1938, Serial No. 183,974

7 Claims. (Cl. 221—95)

This invention relates to an improvement in control mechanism for liquid dispensing apparatus such as a gasoline dispensing pump of the type wherein there is provided a fluid measuring meter, a register indicator for showing the amount of gasoline dispensed, and manual resetting mechanism for restoring the indicator to zero after each dispensing operation.

In present day apparatus of this character the flow establishing means usually comprises an electric motor driven pump with a motor switch for starting and stopping the flow and the delivery means comprises a flexible hose having the usual nozzle with means thereat for control of the actual dispensing of the liquid.

The principal object of the invention is to provide a simplified and low cost control mechanism for the motor switch or other flow establishing means, of such character that the pump attendant will always be induced to perform the steps of a dispensing sale to a customer in a proper sequence, viz. first restore the indicator, (as displayed from a previous sale) to zero, and thereafter dispense the liquid so that the indicator will show accurately the amount of liquid so dispensed. The purpose of such mechanism is to prevent the attendant from trying to cheat a customer in a dispensing sale by deliberately failing to zeroize the indicator and then charging the customer for more gasoline than is actually dispensed to him.

We are aware of prior control mechanism for liquid dispensing pumps which require a resetting or zeroizing of the indicator before each new delivery of gasoline. From such apparatus our present invention is to be distinguished in that we may make a delivery of gasoline at any time, even though the indicator has not been zeroized. However, in such an event the delivery from our apparatus would be for other purposes than a sale, since in our apparatus, a failure to zeroize prevents the indicator from displaying the quantity of the subsequent delivery, and consequently such a blind delivery is not practical for sale purposes. The functional distinction in our control mechanism over the prior mechanism referred to might be summarized in the statement that whereas said prior art shows compulsory zeroizing before any delivery whatever is made, the present improvement provides for compulsory zeroizing only when a sale delivery is to be made and permits delivery for all other purposes without the necessity of zeroizing.

Referring to the drawings which show the preferred embodiment of our invention,

In Fig. 4 the hose nozzle has been removed from its support to more clearly show the parts.

Figs. 4, 5, 6 and 7 show all the parts in the same corresponding position; namely, the off position for the motor switch, and after a zeroizing of the indicator. The apparatus is then ready for a new dispensing operation.

Referring more particularly to the drawings, 1 indicates the pump casing; 2 a combined motor and pump unit adapted to draw gasoline through an intake pipe 3 from a supply (not shown) and deliver the same through outlet pipe 4, flow meter 5, visual flow indicator 6, flexible delivery hose 7, and discharge nozzle 8, all in the usual manner of such pumps. It will be understood that the motor control switch is contained within the casing 9 and that the switch therein for starting and stopping the motor is operated through crank arm 10, connecting link 11, and switch lever 12, the latter being pivoted at 13 on the bracket plate 14 fixed to the pump casing or frame.

Figure 5:
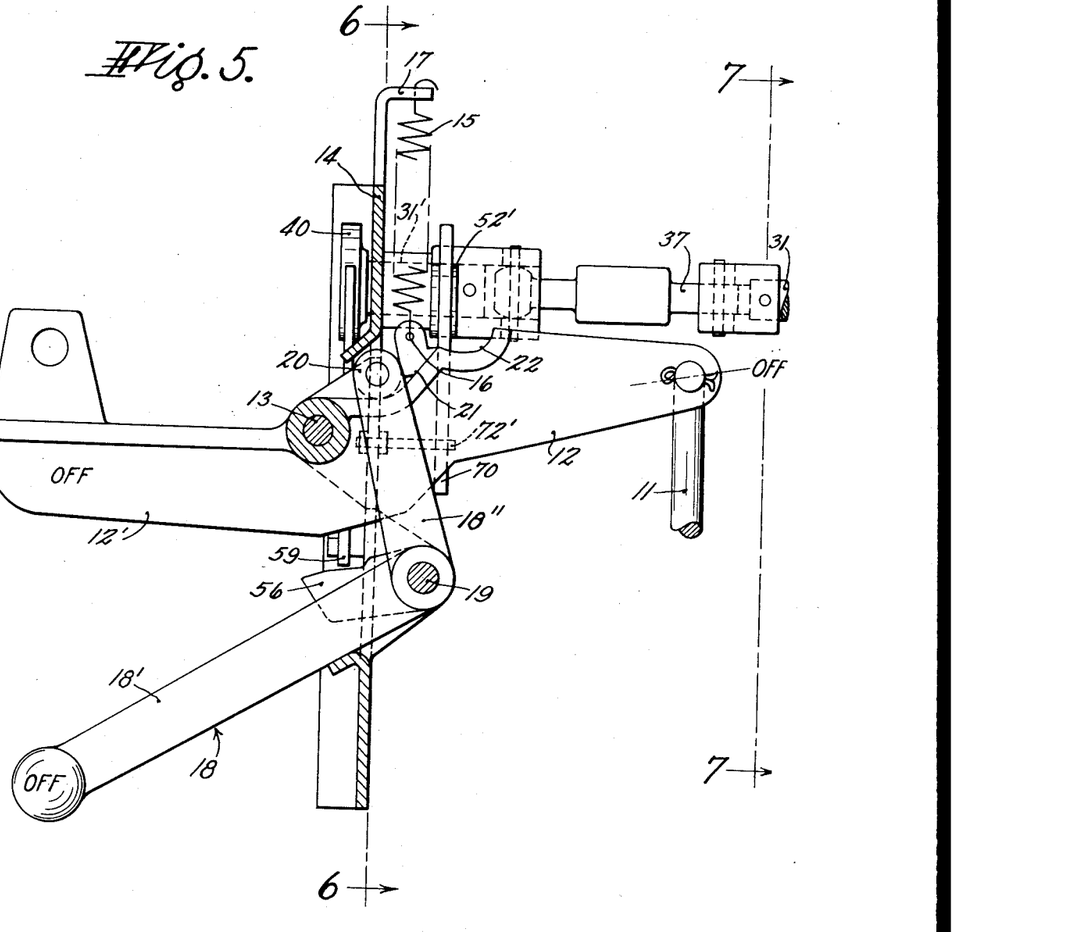
Fig. 5 is a vertical section through the side wall of the pump casing along line 5—5 of Fig. 4, and shows the control mechanism in side view.

The outer portion 12' of the switch lever 12 serves as a support for the hose nozzle 8 as shown in Fig. 5. A spring 15 fastened to said lever at 16 and to a fixed portion of the frame at 17 tends at all times to return the lever to the position shown in Fig. 5, which is the off position of the motor switch.

This switch lever 12 serving also as the nozzle support, may be manually rocked clockwise at any time for turning on the motor switch simply by pushing upwardly on the outer end 12' thereof, which switch on movement may be accomplished irrespective of whether the nozzle 8 is on or off its support 12'. The lever 12 will not remain in its switch on position unless so held because the spring 15 tends to return it to switch off position. The lever 12 may be maintained in its switch on position by continuous manual pressure on the underside of portion 12' or by operating a hold-on lever 18.

Figure 9:
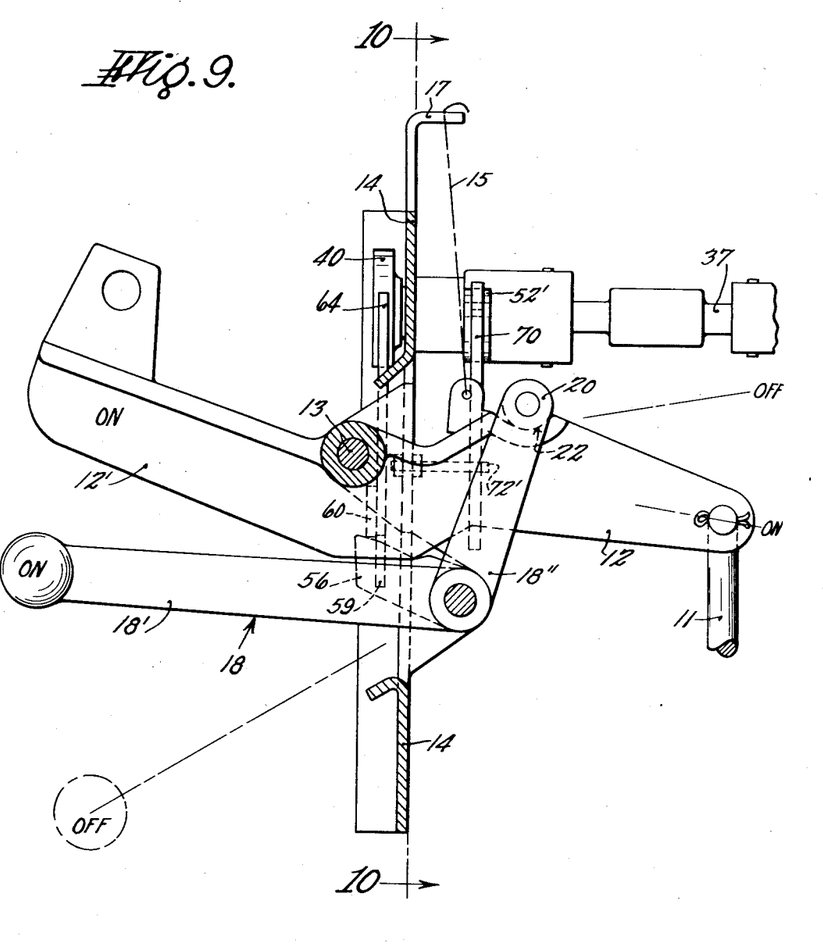

The hold-on lever is of bell crank shape pivoted at 19 on the fixed plate 14 and has a long handle 18' for manual operation and a short arm 18" carrying a roller 20 which works on a cam surface 21 of the switch lever 12. The cam surface 21 terminates in a socket or recess 22 so that when said hold-on lever 18 is rocked clockwise to on position, its roller 20 works on cam surface 21 to likewise throw the switch lever 12 into on position. When the roller 20 reaches the socket 22, the said parts become self-retaining in this on position as shown in Fig. 9. In this self-retained on position the switch lever 12 may be moved to its off position for turning off the motor switch only by depressing handle 18' of the hold-on lever which breaks the toggle-like action previously assumed by these parts, and allows the spring 15 to return the switch lever.

The means for controlling the operation of the switch lever 12 and hold-on lever 18 in connection with the zeroizing action will now be pointed out, and as a preliminary thereto we will briefly describe the common form of register indicator having manually operated resetting mechanism.

Figures 1, 2, 3:
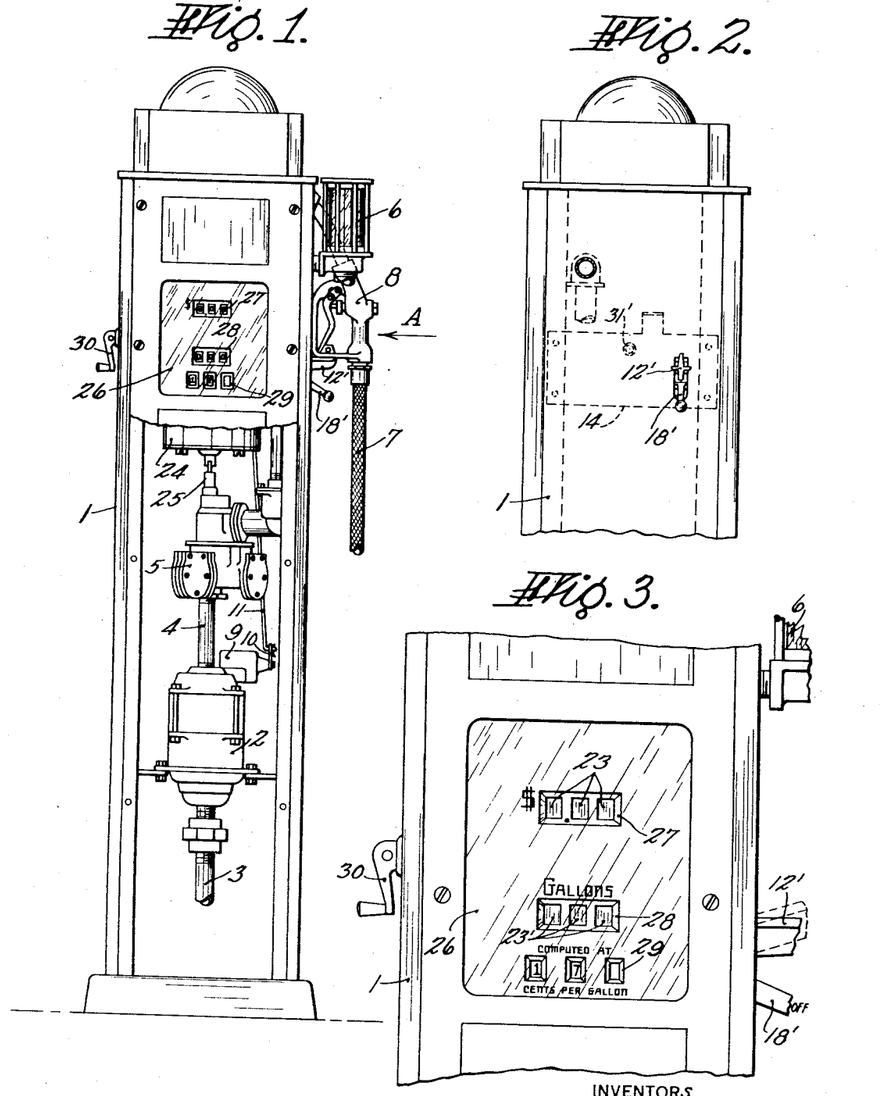
Fig. 1 is a front elevation of the dispensing apparatus or pump with part of the front wall of the casing broken away to show interior parts.
Fig. 2 is a fragmentary detail of the upper end of the pump casing, looking at the right side thereof.
Fig. 3 is a fragmentary detail, somewhat enlarged from that shown in Fig. 1, showing the dial face of the pump casing, with the blinker shutters in closed position. The dotted line position of the switch lever or hose hook support 12' (shown broken off) is its raised position which causes a closing of the blinker shutters in the absence of a prior resetting operation.

Such a register indicator is represented generally at 24 in Fig. 1. It is operated from the meter 5 by connecting shaft 25 and has a dial face 26 with openings therein at 27, 28 for displaying therethrough the different dial wheels of the indicator. The register here shown is of the computer type and the dial wheels at 27 indicate money value of the liquid dispensed and the dial wheels at 28 the quantity. Both of these openings 27 and 28 are provided with blinker shutters 23, 23' (see Fig. 7) which are automatically closed during a resetting operation as will be described. The additional openings at 29 show figures of the daily posted price per gallon and are not generally supplied with shutters.

The details of the resetting mechanism need not be described since it is well known. Suffice to say that it is operated by the revolution of a reset shaft 31 turned by the handle 30. The reset shaft extends transversely through the pump casing and computer head and the right hand end thereof operates the blinker shutters by the mechanism shown in Fig. 7.

Figure 7:
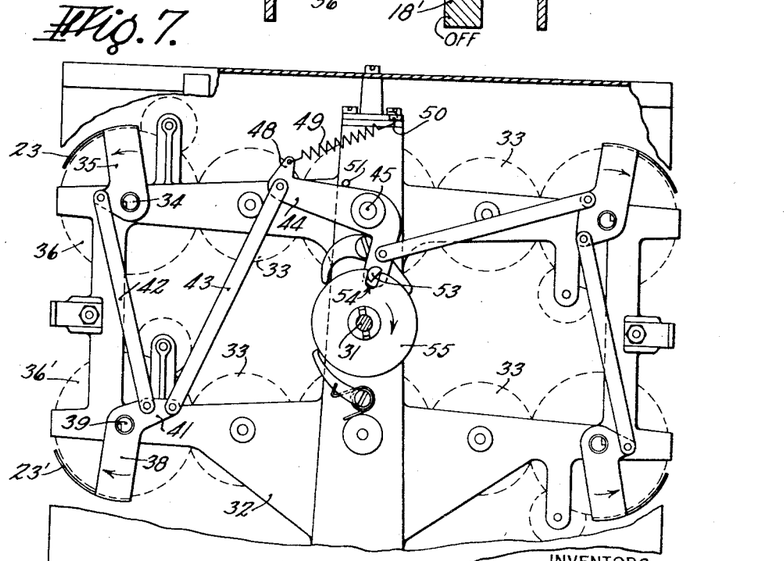
Fig. 7 is a right hand side view (reduced from full size) of the register indicator frame showing in full lines the usual operating mechanism for the blinker shutters of the indicator dial wheels, said dial wheels being shown in dotted lines, and other parts of the register being omitted as unessential to the present disclosure. The parts shown in Fig. 7 are in direct line behind the parts shown in Figs. 4 and 6, and as they would appear when viewed from the plane of section line 7—7 of Fig. 5.

Referring to Fig. 7, the supporting frame for the computer head or register indicator is shown at 32, and has mounted thereon a series of gears 33 shown in dotted lines for operating in the usual manner the dial wheels 36, 36' which are respectively the cost display dial wheels and the quantity display dial wheels. In the conventional form of computer head said dial wheels with appropriate operating mechanism are duplicated for the front and rear of the pump.

At 24 on the supporting frame is pivoted the shutter lever 35 carrying the blinker shutter 23. Similarly pivoted at 39 is the shutter lever 38 for the blinker shutter 23' and said levers 35 and 38 are connected by a link 42 so as to have a synchronous movement in opening and closing the shutters 23, 23'. It will be understood that the shutter levers 35 and 38 each carry sufficient shutter portions such as 23 and 23' for covering all of the dial wheels 36 and 36'. In Fig. 7 the shutters 23 and 23' are shown in open position for displaying said respective dial wheels. One of the shutter levers such as 38 has a crank arm 41 connected by link 43 to a rocking beam 44 pivoted at 45 on the frame 22 which beam constitutes an operating member common to all the blinker shutters. A spring 49 fastened to said beam at 48 and to the frame at 50 tends to constantly hold the shutters in open position as shown. A stop pin 51 limits the opening movement of the rocking beam 44.

A cam disk 55 having a notch 54 therein is fixed to the reset shaft 31. The rocking beam 44 carries a stud 53 which works on the periphery of the cam disk 55 and in and out of said notch in a manner to rock said beam when the reset shaft 31 is rotated. For zeroizing the indicator the reset shaft 31 is rotated in the direction of the arrow in Fig. 7. During the first part of this rotation, approximately 45° thereof, the stud 53 of beam 44 is forced out of notch 54 and on to the periphery of cam disk 55. This initial rocking movement of the beam 44 is sufficient to operate all of the blinker shutters 23, 23', etc., into closed position for concealing the indicator dial wheels. During the remaining part of the reset shaft rotation, the stud 53 rides on the periphery of said cam disk 55 and holds the shutters closed. The shutters remain closed until the stud 53 is again moved into the bottom of notch 54 and this action requires that the reset shaft shall be given a slight overthrow (approximately 45°) beyond its full 360° of rotation and then allowed to settle back to its initial position as shown in Fig. 7. In other words the stud 53 must be moved back into its notch 54 with an action which is the exact reverse of its leaving said notch.

Incidentally it should be stated that in these resetting mechanisms the actual resetting of any of the dial wheels does not begin until the blinker shutters are closed, viz. approximately 45° beyond start of reset shaft rotation—and said resetting is not completed until the end of the overthrow action above described, after which the shutters are opened on the turn back to intial position of the reset shaft. Appropriate devices (not shown) are provided to prevent an improper reverse rotation of the reset shaft after the resetting has begun, whereby once a reset operation has been started and the shutters closed, the reset must be completed to again open said shutters.

Figure 4:
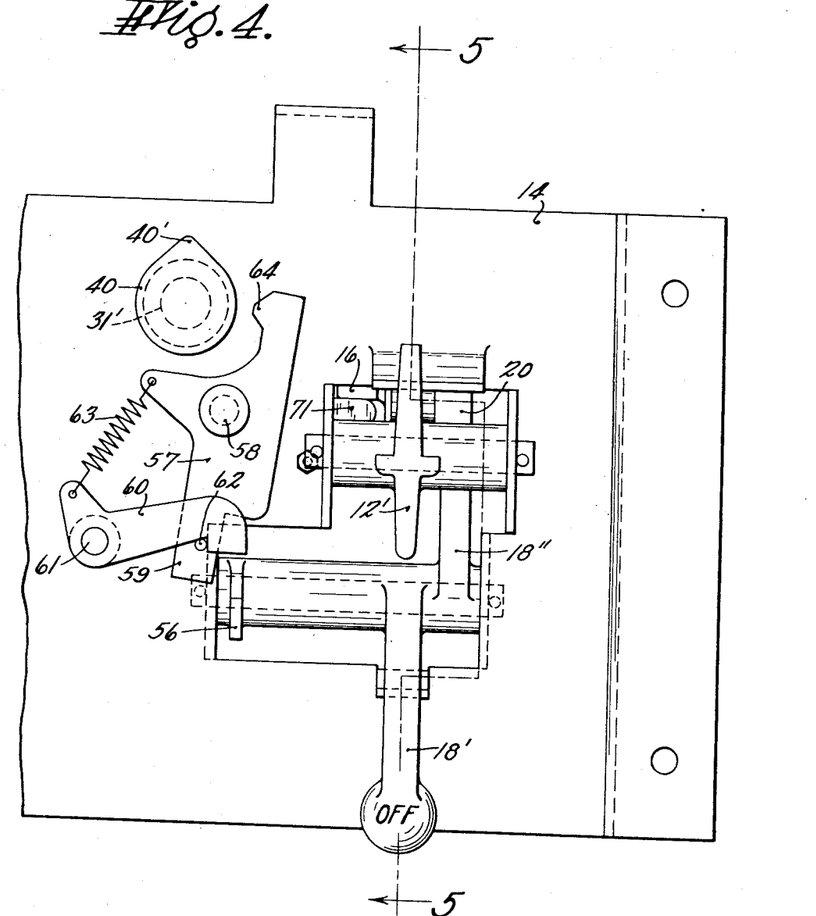
Fig. 4 is a detail front view (full size) of the control mechanism looking at the side of the pump in the direction of the arrow A in Fig. 1.
Figure 6:
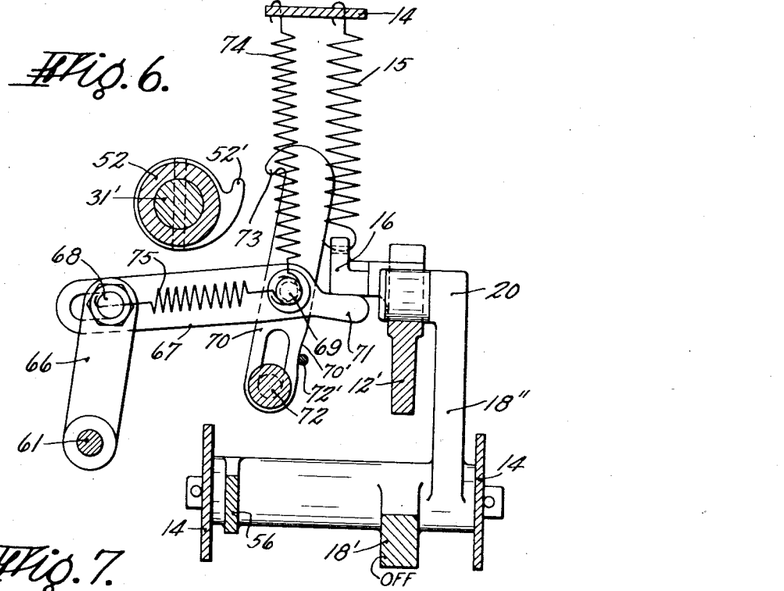
Fig. 6 shows further parts of the control mechanism as they appear from the plane of section line 6—6 of Fig. 5. It should be understood that the parts shown in Fig. 4 appear on the outside of a bracket supporting plate indicated in dotted lines in Fig. 2 and which lies parallel to and spaced inwardly from the side wall of the pump casing. The parts of Fig. 6 are directly behind the parts in Fig. 4 on the inside of said bracket plate.

The interconnecting mechanism between the reset mechanism and the hold-on lever will now be described. Referring to Figs. 4, 5 and 6, a shaft extension 31' is in line with and coupled to the reset shaft 31 by coupling member 37. The shaft extension 31' has its bearing through the bracket plate 14 and has fixed thereto at the outer side of said plate a cam disk 40 having cam lobe 40'. At the inner side of said plate 14 and also fixed to the shaft extension 31' is a single toothed ratchet 52, its single tooth being indicated at 52'.

The hold-on lever 18 has formed integral therewith a short arm 56 projecting from its bearing sleeve in the same general direction as the handle 18' (see Figs. 4 and 5). A locking dog 57 is pivoted at 58 on the main frame, viz. outside of the bracket plate 14, and has a foot portion 59 adapted to be positioned in or out of the upward path of movement of the arm 56. When the foot 59 of said locking dog 57 is in said path the hold-on lever is locked from movement since the handle 18' may not then be raised (see Fig. 11). The dog 57 is shown in its unlocking position in Fig. 4 wherein the handle 18' is free to be raised. The dog 57 is arranged to be temporarily latched in its unlocking position of Fig. 4 by means of a hook latch 60 pivoted at 61 on the main frame or bracket and having a hook portion adapted to engage a pin 62 on the dog 57. A spring 63 is connected between arms of said latch and said dog tending to rotate the latch clockwise and the dog counter-clockwise. Thus the action of spring 63 tends always to move dog 57 into its locking position. A nose portion 64 of said dog 57 also under the force of spring 63 tends to bear against the periphery of the cam disk 40.

Figures 11, 12:
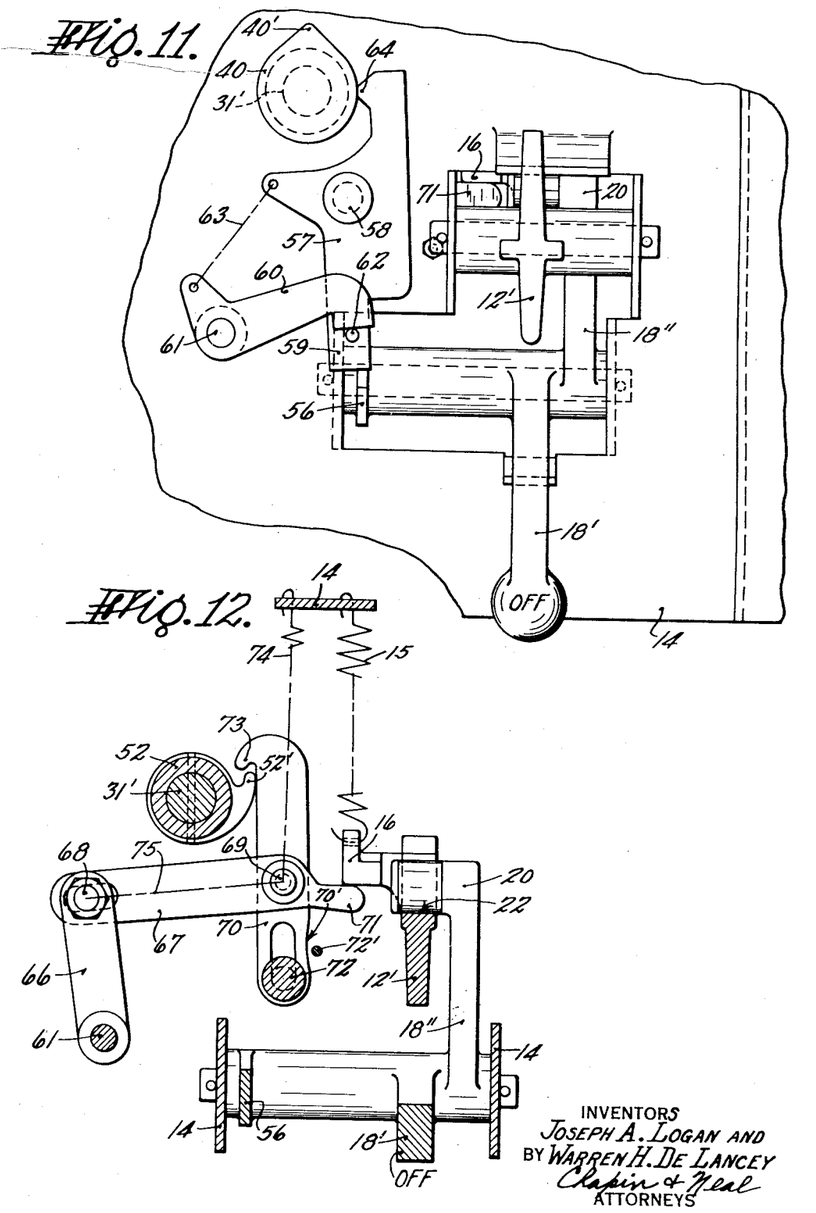
Figs. 11 and 12 are analogous to the views in Figs. 4 and 6 respectively showing the parts in off position, but prior to zeroizing operation.

When the reset shaft 31 is rotated for a zeroizing operation, the shaft extension 31' is rotated clockwise viewing Fig. 11. At the initial part of said rotation and after the blinker shutters have been closed as previously described, the cam lobe 40' engages the nose 64 of dog 57 and rocks said dog from the position shown in Fig. 11 to that shown in Fig. 4. This unlocking action renders the hold-on lever 18 operative, and at the same time permits the latch 60 to hook over the pin 62 and temporarily retain the dog 57 in its unlocking position.

Figure 8:
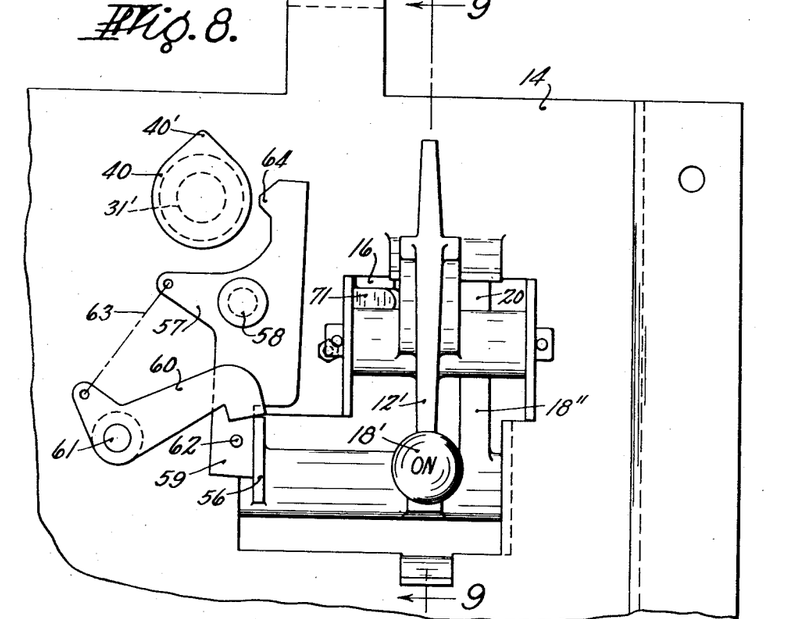
Figs. 8, 9 and 10 are analogous to the views Figs. 4, 5 and 6, respectively, and show the position of the parts with the motor switch in on position during a dispensing operation.

In this condition of the parts the hold-on lever 18 is operative to throw on and hold on the switch lever 12 in switch closed position. When the handle 18' of the hold-on lever is lifted its arm 56 after rising alongside of the foot 59 of dog 57 strikes the hook end of latch 60 and disengages it from the pin 62 thereby releasing said dog 57 from its latch 60 as shown in Fig. 8. This release of the dog 57 permits it to rotate slightly counterclockwise under force of spring 63 until foot portion 59 abuts against the side of the raised arm 56, whereby when said handle 18' and arm 56 are again depressed the latch will not be able to again hook over pin 62 but will rest on top of said pin as shown in Fig. 11. Accordingly the locking dog 57 will promptly swing over to its locking position when the arm 56 is thus depressed.

Selectively operated connections are provided between the switch lever 12 and the shutter operating mechanism whereby the movement of said switch lever to switch on position without having previously operated said reset mechanism will close the shutters, but a movement of said switch lever to on position after a reset operation will leave said shuters undisturbed in open position.

The preferred mechanism for this purpose is as follows, referring to Figs. 6, 10 and 12. The pivot shaft 61 to which the latch 60 is fixed, extends through the bracket plate 14 and has fixed thereto at the inner side of said plate an arm 66. A link lever 67 has one end slotted for a sliding fulcrum connection to the pin 68 of the arm 66. The other end of link lever 67 is pivotally connected at 69 to a hook pawl 70 and has an extension finger 71 which lies beneath a ledge 16 projecting laterally from the switch lever 12. Whenever the inner end of switch lever 12 is depressed for turning on the switch, ledge 16 swings the link lever 67 downwardly about its fulcrum 68. The hook pawl 70 is slotted at its lower end for a sliding fulcrum connection to pin 72 fixed to the main frame. The upper end of pawl 70 is hooked at 73 for engagement at certain times with the single tooth 52' of ratchet 52 on the reset shaft extension 31'. A spring 74 fastened to the main frame or bracket plate and to the pivot 69 tends to lift the pawl 70 and its connected link lever 67 while a spring 75 connected between pivot 69 and fulcrum 68 tends to keep said link lever 67 at the right hand end of its slot on said fulcrum 68.

Whenever the hook latch 60 (see Fig. 4) swings clockwise to hook over pin 62, its pivot shaft 61 likewise swings arm 66 (see Fig. 6) to the right and through link lever 67 pushes the pawl 70 also to the right so that its hook 73 will not engage ratchet tooth 52, if and when said lever finger 71 is depressed by the ledge 16. It will be recalled that hook latch 60 acts to engage pin 62 only when the reset shaft has started its rotation for a resetting operation and has moved far enough to have cam 40 throw out the locking dog 57. Consequently each start of a resetting operation will move the pawl 70 to an idle position. In such a situation when the switch lever 12 is thrown on the pawl 70 will be moved downwardly past ratchet tooth 52 without engagement therewith to the position shown in Fig. 10. In this idle downward movement of pawl 70, a cam surface 70' on the back of said pawl coacts with a fixed pin 72' on the main frame, to rock said pawl 70 slightly to the left on its fulcrum 72. This leftwise movement of pawl 70 will through link 67 rock arm 66 and pivot shaft 61, and lift latch 60 off pin 62 to release the stop dog 57. Thus an off position movement either of hold-down lever 18' or of switch lever 12' will serve to release latch 60 from its pin 62.

Figure 10:
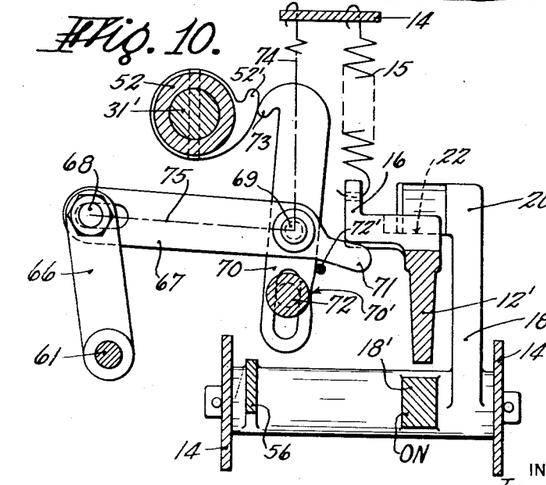

Incidentally it should be noticed that in the position of parts shown in Fig. 10 with the switch on and the motor running and possibly a dispensing flow taking place through the nozzle so that the meter is running up figures on the register indicator, any false operation of the reset shaft (called false because it should not be attempted under such conditions) will close the shutters and it will not be possible to complete the reset and open the shutter until the motor, meter and register are stopped. This follows from the fact that as before described the reset shaft in completing a reset has an overthrow of about 45° beyond its 360° of rotation and then turns back to its initial position to reinsert stud 53 into its notch 54 for opening the shutter (see Fig. 5). The above 45° overthrow of the reset shaft 31 carries the tooth 52' (see Fig. 10) beyond the hook 73 of pawl 70 which immediately engages said ratchet tooth 52' due to the action of spring 75. Thus the reset shaft will be locked in its overthrow position with the shutters locked closed until the pawl 70 can be raised, and this can only occur when the switch lever 12 is thrown to off position shutting off the motor.

Referring now to Figs. 5, 11 and 12 these views show the position of the parts after a dispensing operation has been completed and the motor switch has been turned off, and prior to a resetting operation of the indicator. The hold-on handle 18' cannot be operated; it is locked in off position as previously described and as shown in Fig. 11. However, the attendant may yet turn on the motor by lifting outer end 12' of switch lever 12 and thus dispense gasoline, but if he does so in this manner the shutters will close over the indicator and prevent a dispensing sale by the following mechanism. As shown in Fig. 12 the hook pawl 70 is in potential engagement with ratchet tooth 52', because reset shaft 31 has not been rotated and hook latch 60 has not dropped over its pin 62 (see Fig. 11). Thereupon when the attendant rocks the switch lever 12 to turn on the motor and depresses the ledge 16, a sufficient downward stroke is imparted to hook pawl 70 by the finger 71, to turn the ratchet 52 and reset shaft 31 to close the blinker shutters 23 (see Fig. 7). The reset shaft having thus been started on a resetting rotation cannot be turned back (an inherent characteristic of such resetting mechanism) with the result that the only way to open the shutters is to complete the reset whereupon when the shutters open, the indicator dial wheels will be at zero.

It is to be understood that the present disclosure as above described is for the purpose of illustrating a suitable embodiment of the invention and that said invention includes all modifications and equivalents which properly fall within the scope of the following claims.

We claim:

1. Control mechanism for the flow in liquid dispensing apparatus of the type having a register indicator for the quantity of liquid dispensed and manually operative reset mechanism to restore said indicator to zero after a dispensing operation, said control mechanism comprising a control member freely movable by hand to an on position to establish flow and tending automatically to move to an off positon to stop flow; a hold-on member operable for holding said control member in on position and movable to release said control member, a shutter having open and closed positions for revealing and concealing said indicator, selectively operated connections between said control member and said shutter whereby said control member in moving to on position before a reset operation acts to close said shutter, and interconnecting mechanism between said hold-on member and said reset mechanism whereby the operativeness of said hold-on member is dependent upon the prior operation of said reset mechanism.

2. Control mechanism for the flow in liquid dispensing apparatus of the type having a register indicator for the quantity of liquid dispensed and manually operative reset mechanism to restore said indicator to zero after a dispensing operation, said control mechanism comprising a control member freely movable by hand to an on position to establish flow and tending automatically to move to an off position to stop flow, a hold-on member operable for holding said control member in on position and movable to release said control member, a shutter having open and closed positions for revealing and concealing said indicator, selectively operated connections between said control member and said shutter whereby said control member in moving to on position before a reset operation acts to close said shutter and in moving to on position after a reset operation fails to close said shutter, and interconnecting mechanism between said hold-on member and said reset mechanism whereby the operativeness of said hold-on member is dependent upon the prior operation of said reset mechanism.

3. Control mechanism for the flow in liquid dispensing apparatus of the type having a register indicator for the quantity of liquid dispensed and manually operative reset mechanism to restore said indicator to zero after a dispensing operation, said control mechanism comprising a control member freely movable by hand to an on position to establish flow and tending automatically to move to an off position to stop flow, a hold-on member operable for holding said control member in on position and movable to release said control member, a shutter having open and closed positions for revealing and concealing said indicator, selectively operated connections between said control member and said shutter whereby said control member in moving to on position before a reset operation acts to close said shutter and in moving to on position after a reset operation fails to close said shutter, and means actuated by the operation of said reset mechanism to open a closed shutter, and interconnecting mechanism between said hold-on member and said reset mechanism whereby the operativeness of said hold-on member is dependent upon the prior operation of said reset mechanism.

4. Control mechanism for the flow in liquid dispensing apparatus of the type having a motor and switch for establishing said flow, a register indicator for the quantity of liquid dispensed and manually operative reset mechanism to restore said indicator to zero after a dispensing operation, said control mechanism comprising a switch operating member freely movable by hand to switch on position and tending automatically to move to switch off position, a hold-on member operable for holding said switch member in on position and movable to release said switch member, a shutter having open and closed positions for revealing and concealing said indicator, selectively operated connections between said switch member and said shutter whereby said switch member in moving to on position before a reset operation acts to close said shutter, and interconnecting mechanism between said hold-on member and said reset mechanism whereby the operativeness of said hold-on member is dependent upon the prior operation of said reset mechanism.

5. Control mechanism for the flow in liquid dispensing apparatus of the type having a motor and switch for establishing said flow, a register indicator for the quantity of liquid dispensed and manually operative reset mechanism to restore said indicator to zero after a dispensing operation, said control mechanism comprising a switch operating member freely movable by hand to switch on position and tending automatically to move to switch off position, a manually operated hold-on member movable to active position to hold said switch member in on position, and movable to inactive position to release said switch member, a shutter having open and closed positions for revealing and concealing said indicator, selectively operated connections between said switch member and said shutter whereby said switch member in moving to on position before a reset operation acts to close said shutter, and interconnecting mechanism between said hold-on member and said reset mechanism whereby said hold-on member is prevented from moving to its hold-on position until said reset mechanism is operated.

6. Control mechanism for the flow in liquid dispensing apparatus of the type having a motor and switch for establishing said flow, a hose and delivery nozzle through which said flow is dispensed, a register indicator for the quantity of liquid dispensed and manually operative reset mechanism to restore said indicator to zero after a dispensing operation, said control mechanism comprising a switch connected lever having a portion thereof serving as a support for said hose nozzle, said lever being freely movable by hand at any time for closing said switch and a spring tending automatically to move said lever to its off position for opening said switch, a manually operated hold-on member movable to active position to hold said switch lever in on position, and movable to inactive position to release said switch lever, a shutter having open and closed positions for revealing and concealing said indicator, selectively operated connections between said switch lever and said shutter whereby said switch lever in moving to on position before a reset operation acts to close said shutter, and interconnecting mechanism between said hold-on member and said reset mechanism whereby said hold-on member is prevented from moving to its hold-on position until said reset mechanism is operated.

7. Control mechanism for the flow in liquid dispensing apparatus of the type having a motor and switch for establishing said flow, a register indicator for the quantity of liquid dispensed and manually operative reset mechanism to restore said indicator to zero after a dispensing operation, said control mechanism comprising a switch operating member freely movable by hand to switch on position and tending automatically to move to switch off position, a manually operated hold-on member acting when moved into its on position to move said switch member into on position and hold it in said position, said hold-on member when moved into its off position acting to release said switch member, a shutter having open and closed positions for revealing and concealing said indicator, selectively operated connections between said switch member and said shutter whereby said switch member in moving to on position before a reset operation acts to close said shutter, and interconnecting mechanism between said hold-on member and said reset mechanism whereby said hold-on member is prevented from moving to its hold-on position until said reset mechanism is operated.

JOSEPH A. LOGAN.
WARREN H. DE LANCEY.